(12) United States Patent
Sumigawa et al.

(10) Patent No.: US 7,223,139 B2
(45) Date of Patent: May 29, 2007

(54) OUTBOARD MOTOR WITH PLASTIC OIL PAN

(75) Inventors: Yukio Sumigawa, Hamamatsu (JP); Takio Ogasawara, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/818,875

(22) Filed: Apr. 5, 2004

(65) Prior Publication Data

US 2004/0198110 A1 Oct. 7, 2004

(30) Foreign Application Priority Data

Apr. 4, 2003 (JP) ............... 2003-101323

(51) Int. Cl.
*B63H 20/00* (2006.01)
*B63H 20/24* (2006.01)
*B63H 21/38* (2006.01)
*F01M 11/00* (2006.01)

(52) U.S. Cl. ............... 440/88 R; 440/88 L; 440/89 R

(58) Field of Classification Search ............ 440/88 R, 440/88 L, 89 B, 89 C, 88 C, 88 D, 88 G, 440/88 HE, 89 R, 89 J
See application file for complete search history.

(56) References Cited

U.S. PATENT DOCUMENTS

| | | | |
|---|---|---|---|
| 5,232,387 A | 8/1993 | Sumigawa | 440/88 |
| 5,487,688 A | 1/1996 | Sumigawa | 440/88 |
| 5,595,515 A | 1/1997 | Hasegawa et al. | 440/89 |
| 5,733,157 A | 3/1998 | Okuzawa et al. | 440/89 |
| 5,924,901 A | 7/1999 | Takahashi et al. | 440/88 |
| 5,954,022 A | 9/1999 | Katayama et al. | 123/195 |
| 6,039,618 A * | 3/2000 | Hiraoka et al. | 440/89 R |
| 6,126,499 A | 10/2000 | Katayama et al. | 440/88 |
| 6,302,754 B1 | 10/2001 | Kashima | 440/88 |
| 6,409,557 B1 * | 6/2002 | Tsunekawa et al. | 440/88 R |
| 6,416,372 B1 | 7/2002 | Nozue | 440/88 |
| 6,634,913 B2 | 10/2003 | Isozaki et al. | 440/88 |
| 6,783,413 B2 | 8/2004 | Nakata et al. | |
| 6,893,306 B2 * | 5/2005 | Shibata et al. | 440/88 G |
| 2001/0044245 A1 | 11/2001 | Nakata et al. | 440/89 |
| 2002/0002019 A1 | 1/2002 | Nakata et al. | 440/89 |
| 2002/0197920 A1 | 12/2002 | Nakata et al. | 440/88 |

FOREIGN PATENT DOCUMENTS

JP 9-79486 3/1997

OTHER PUBLICATIONS

English translation of JP 09-079486 A.*

* cited by examiner

*Primary Examiner*—Ajay Vasudeva
(74) *Attorney, Agent, or Firm*—Knobbe, Martens, Olson & Bear LLP

(57) ABSTRACT

An outboard motor incorporates an engine. An exhaust conduit is disposed below the engine. The exhaust conduit forms a first exhaust passage to discharge exhaust gases from the engine. A plastic lubricant pan (e.g., oil pan) is disposed below the engine to accumulate lubricant that lubricates a portion of the engine. The lubricant pan at least in part surrounds the exhaust conduit. In some embodiments, a protective member is provided to protect the lubricant pan from flames that descend from the engine toward the exhaust conduit or heat of the exhaust gases. In other embodiments, a protective member includes an exhaust conduit that generally shields the lubricant pan such that the lubricant pan is not exposed to the flames or the exhaust gases.

21 Claims, 11 Drawing Sheets

OUTBOARD MOTOR WITH PLASTIC OIL PAN

PRIORITY INFORMATION

The present application is based on and claims priority under 35 U.S.C. § 119 to Japanese Patent Application No. 2003-101323, filed on Apr. 4, 2003; the entire content of which is expressly incorporated by reference herein.

BACKGROUND OF THE INVENTION

1. Field of the Invention

This invention relates generally to an outboard motor with a plastic lubricant pan, and more particularly to an outboard motor having a plastic lubricant pan and an exhaust conduit surrounded by the lubricant pan.

2. Description of Related Art

An outboard motor typically has a housing unit that can be mounted on an associated watercraft and an internal combustion engine disposed above the housing unit. The housing unit carries a propulsion device such as, for example, a propeller to propel the watercraft. The engine powers the propulsion device with a driveshaft and a propulsion shaft extending through the housing unit.

The engine can be a four-cycle engine. If the outboard motor employs the four-cycle engine, an oil pan or lubricant reservoir is typically disposed below the engine within the housing unit. The oil pan accumulates lubricant oil that has circulated in the engine for lubrication of various moving engine parts. A portion of such oil pans for outboard motors are made of a plastic material, because a plastic oil pan is durable against salt content of seawater, acids produced from exhaust gases and water, and the like. For example, Japanese Patent Publication No. 9-79486 discloses such a plastic oil pan.

The outboard motor also has an exhaust system to route the exhaust gases from the engine through the housing unit to an external location. Typically, internal exhaust sections are provided within the housing unit and the majority of exhaust gases are discharged through the internal exhaust sections to a body of water that surrounds the outboard motor. The internal exhaust sections include an exhaust conduit disposed below the engine.

Because the exhaust conduit extends through a space where the oil pan is disposed, typically the oil pan is generally configured as a doughnut shape such that the exhaust conduit passes through the oil pan. In other words, the oil pan generally surrounds the exhaust conduit. In some arrangements, a center portion of the oil pan can form an exhaust passage that communicates with the exhaust conduit.

The exhaust system produces heat due to an air/fuel charge that burns in one or more combustion chamber of the engine. The burnt charges, i.e., hot exhaust gases, pass through the exhaust system. In addition, it is possible that flames from the combustion chamber(s) can reach the exhaust conduit.

If the outboard motor employs the foregoing plastic oil pan, a relatively large space is necessary between the oil pan and the exhaust conduit to isolate the oil pan from the exhaust conduit. In addition, if a portion of the plastic oil pan forms a part of exhaust passages as discussed above, the oil pan portion needs to be thicker than that of an oil pan made of metal. A plastic oil pan needs to be thicker because a plastic oil pan that is too thin can be relatively easily deformed or melted by the heat of exhaust gases or flames. The oil pan cannot extend outward beyond a pre-determined area because the housing unit that embraces the oil pan should be kept small to make the outboard motor compact. An oil pan that extends vertically beyond a pre-determined area also is not suitable because additional parts of the internal exhaust sections such as an exhaust expansion pipe cannot have sufficient volume to reduce the exhaust energy. As a result, a substantial capacity of the oil pan for the lubricant oil is normally smaller than that of an oil pan using a metal material.

SUMMARY OF THE INVENTION

A need therefore exists for an outboard motor that can effectively protect a plastic oil pan from the exhaust heat or flames from one or more combustion chambers and can allow the plastic oil pan to have a sufficient capacity therein for lubricant oil.

In accordance with one aspect of the present invention, an outboard motor comprises an internal combustion engine. An exhaust conduit is disposed below the engine and forms a first exhaust passage to discharge exhaust gases from the engine. A lubricant pan is disposed below the engine for containing a reservoir of lubricant for the engine. At least a portion of the lubricant pan extends about at least a portion of the exhaust conduit and at least a substantial portion of the lubricant pan is comprised of a plastic material. A protection member is configured to protect the lubricant pan from flames that descend from the engine toward the exhaust conduit and from the heat of the exhaust gases In accordance with another aspect of the present invention, an outboard motor comprises an internal combustion engine. An exhaust conduit is disposed below the engine and forms a first exhaust passage to discharge exhaust gases from the engine. A plastic lubricant pan is disposed below the engine, and at least part of the lubricant pan surrounds the exhaust conduit. A portion of the lubricant pan forms a second exhaust passage that communicates with the first exhaust passage such that the exhaust gases from the engine reach the first exhaust passage through the second exhaust passage. A protective member is disposed generally at the second exhaust passage. The protective member has an orifice through which the exhaust gases pass and the protective member is configured to direct exhaust gases or flames from the engine generally toward a center axis of the second exhaust passage.

In accordance with a further aspect of the present invention, an outboard motor comprises an internal combustion engine. An exhaust conduit is disposed below the engine. The exhaust conduit forms a first exhaust passage to discharge exhaust gases from the engine. A lubricant pan, which generally is a plastic component, is disposed below the engine and surrounds the exhaust conduit. A top end of the exhaust conduit is positioned so as not to be lower than a top end of a portion of the lubricant pan that lies generally next to the top end of the exhaust conduit.

BRIEF DESCRIPTION OF THE DRAWINGS

These and other features, aspects and advantages of the present invention will now be described with reference to the drawings of preferred embodiments, which are intended to illustrate and not to limit the invention. The drawings comprise 13 figures in which.

DETAILED DESCRIPTION OF THE PREFERRED EMBODIMENTS OF THE INVENTION

Figure 1:
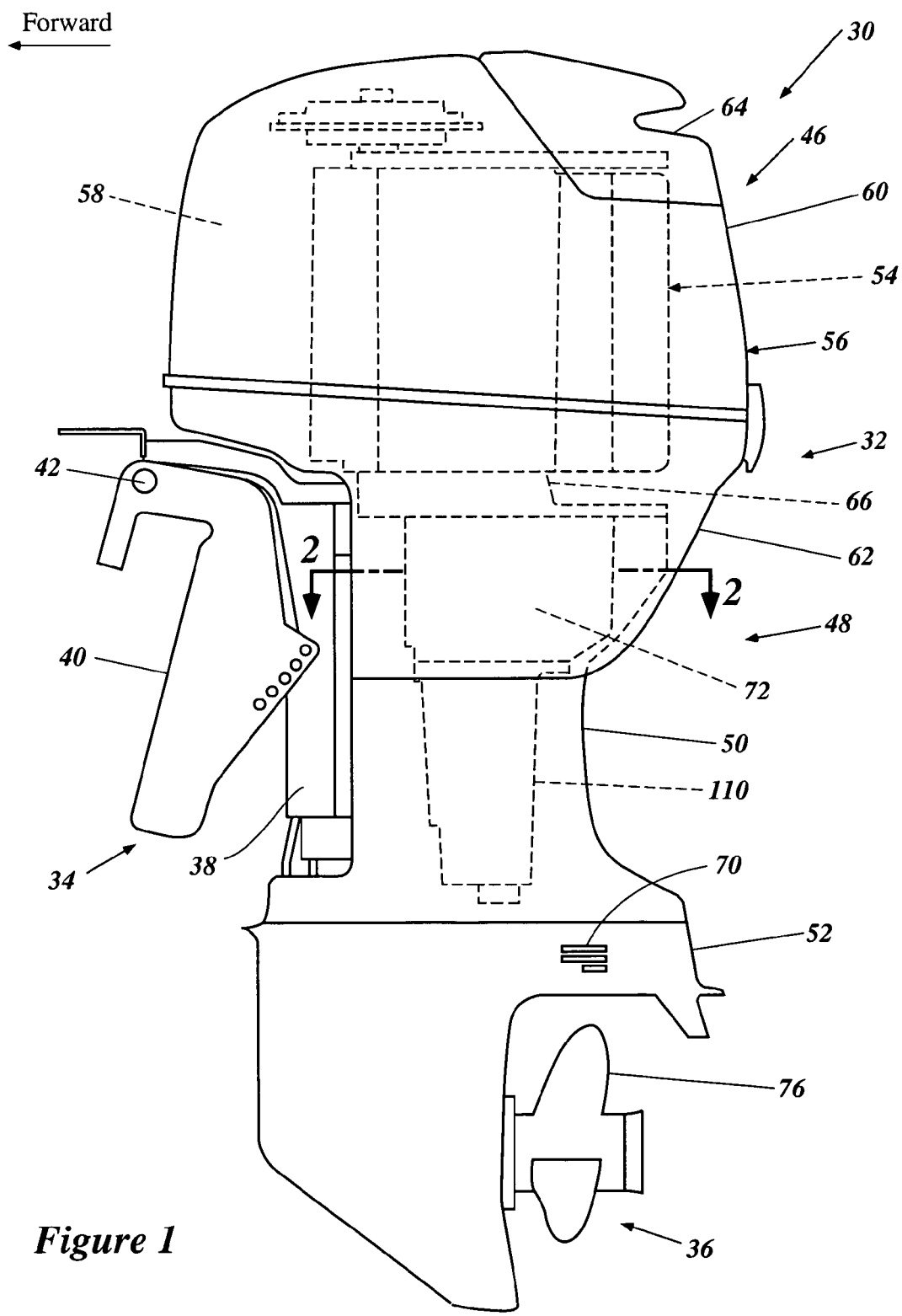
FIG. 1 illustrates a side elevational view of an outboard motor configured in accordance with certain features, aspects and advantages of the present invention.

With particular reference to FIG. 1, an overall construction of an outboard motor 30 configured in accordance with certain features, aspects and advantages of the present invention is described.

In the illustrated arrangement, the outboard motor 30 preferably comprises a drive unit 32 and a bracket assembly 34. The bracket assembly 34 supports the drive unit 32 on a transom of an associated watercraft and places a marine propulsion device 36 in a submerged position with the watercraft resting on the surface of a body of water. The bracket assembly 34 preferably comprises a swivel bracket 38, a clamping bracket 40, a steering shaft and a pivot pin 42.

The steering shaft preferably extends through the swivel bracket 38 and is affixed to the drive unit 32 with upper and lower mount assemblies. The steering shaft is pivotally journaled for steering movement about a generally vertically extending steering axis defined within the swivel bracket 38. The clamping bracket 40 comprises a pair of bracket arms that are spaced apart from each other and are affixed to the watercraft transom. The pivot pin 42 completes a hinge coupling between the swivel bracket 38 and the clamping bracket 40. The pivot pin 42 extends through the bracket arms so that the clamping bracket 40 supports the swivel bracket 38 for pivotal movement about a generally horizontally extending tilt axis defined by the pivot pin 42. The drive unit 32 thus can be tilted about the tilt axis.

As used through this description, the terms "forward," "forwardly" and "front" mean at or to the side where the bracket assembly 34 is located, and the terms "rear," "reverse," "backwardly" and "rearwardly" mean at or to the opposite side of the front side, unless indicated otherwise or otherwise readily apparent from the context use.

A hydraulic tilt and trim adjustment system preferably is provided between the swivel bracket 38 and the clamping bracket 40 to tilt (raise or lower) the swivel bracket 38 and the drive unit 32 relative to the clamping bracket 40. Otherwise, the outboard motor 30 can have a manually operated system for tilting the drive unit 32. Typically, the term "tilt movement," when used in a broad sense, comprises both a tilt movement and a trim adjustment movement.

The illustrated drive unit 32 preferably comprises a power head 46 and a housing unit 48 which includes a driveshaft housing 50 and a lower unit 52. The power head 46 is disposed atop the drive unit 32 and houses an internal combustion engine 54 that is positioned within a protective cowling assembly 56. Preferably, the protective cowling assembly 56 defines a generally closed cavity 58 in which the engine 54 is disposed. The protective cowling assembly 56 preferably comprises a top cowling member 60 and a bottom cowling member 62.

The top cowling member 60 preferably is detachably affixed to the bottom cowling member 62 by a coupling mechanism so that a user, operator, mechanic or repairperson can access the engine 54 for maintenance or for other purposes. The top cowling member 60 preferably has a separable portion that defines an air intake opening 64 and is positioned at a rear and top portion of the other part of the top cowling member 60. The ambient air is drawn into the closed cavity 58 through the opening 64. Typically, the top cowling member 60 tapers in girth toward its top surface, which is in the general proximity of the air intake opening 64.

Figure 2:
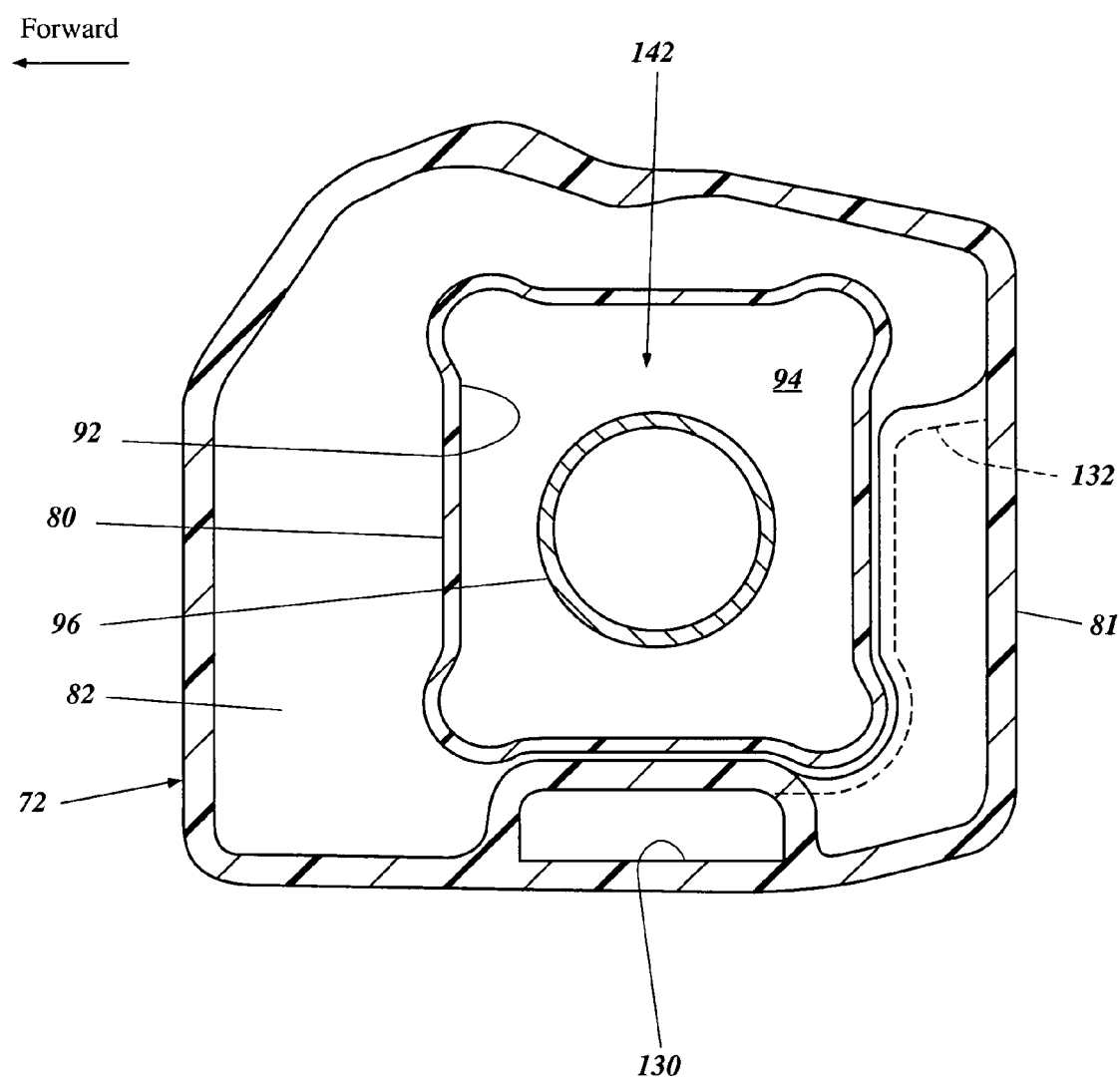
FIG. 2 illustrates a cross-sectional view of a housing unit of the outboard motor of FIG. 1 taken along the line 2—2 of FIG. 1.
Figure 3:
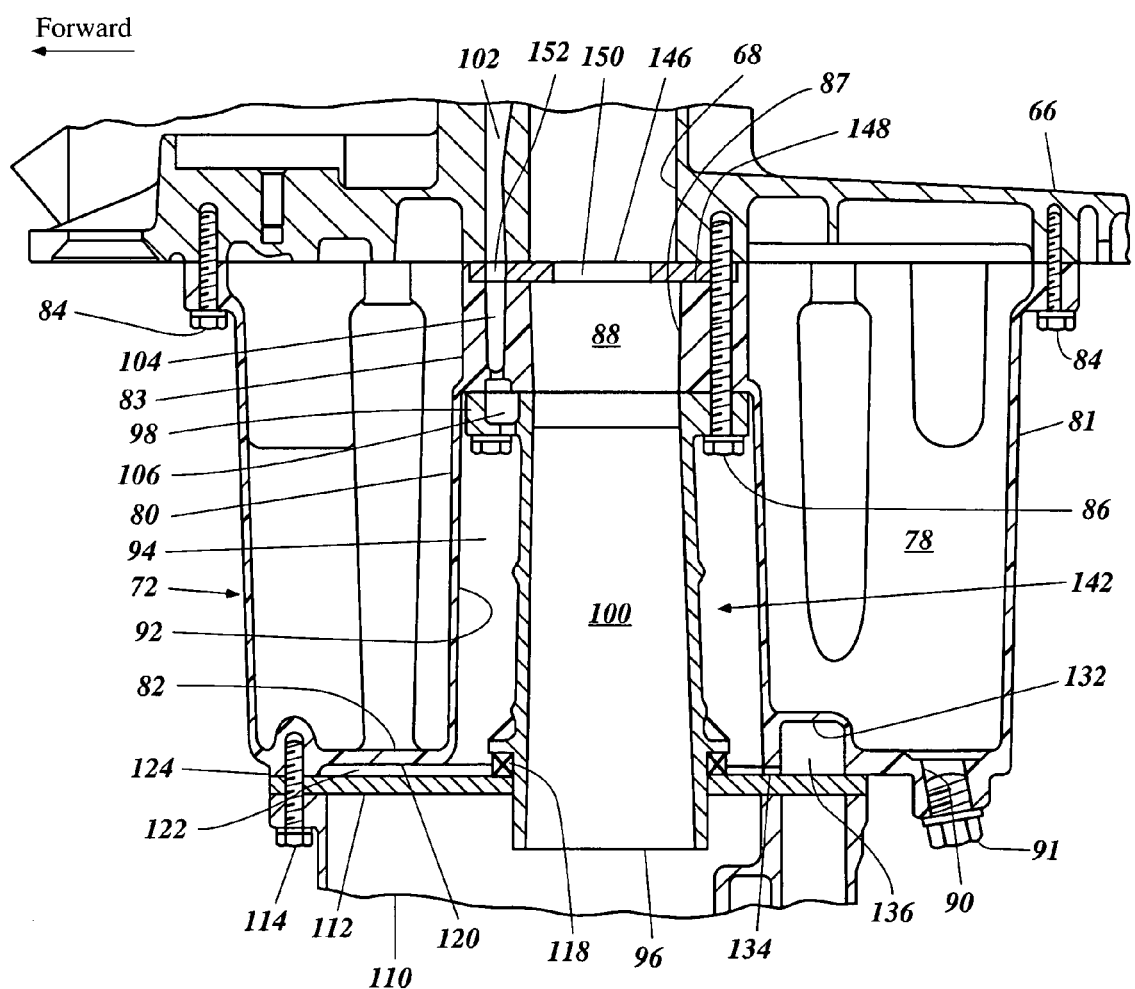
FIG. 3 partially illustrates a side cross-sectional view of the housing unit taken along a longitudinal line extending fore to aft, showing at least an oil pan, an exhaust conduit, a protective member and a partition.
Figure 4:
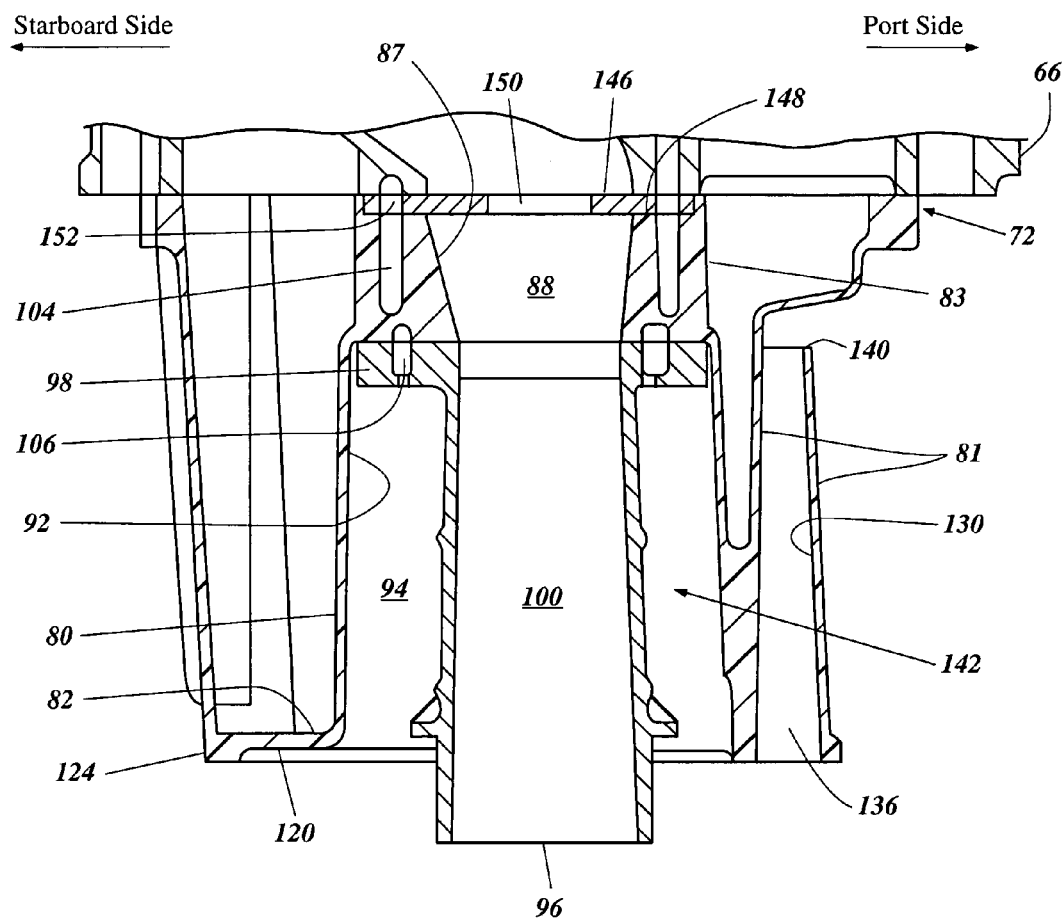
FIG. 4 partially illustrates a front cross-sectional view of the housing unit taken along a transverse line extending normal to the longitudinal line, showing the oil pan, the exhaust conduit and the protective member, the partition and an exhaust expansion chamber member being removed in this figure.
Figure 5:
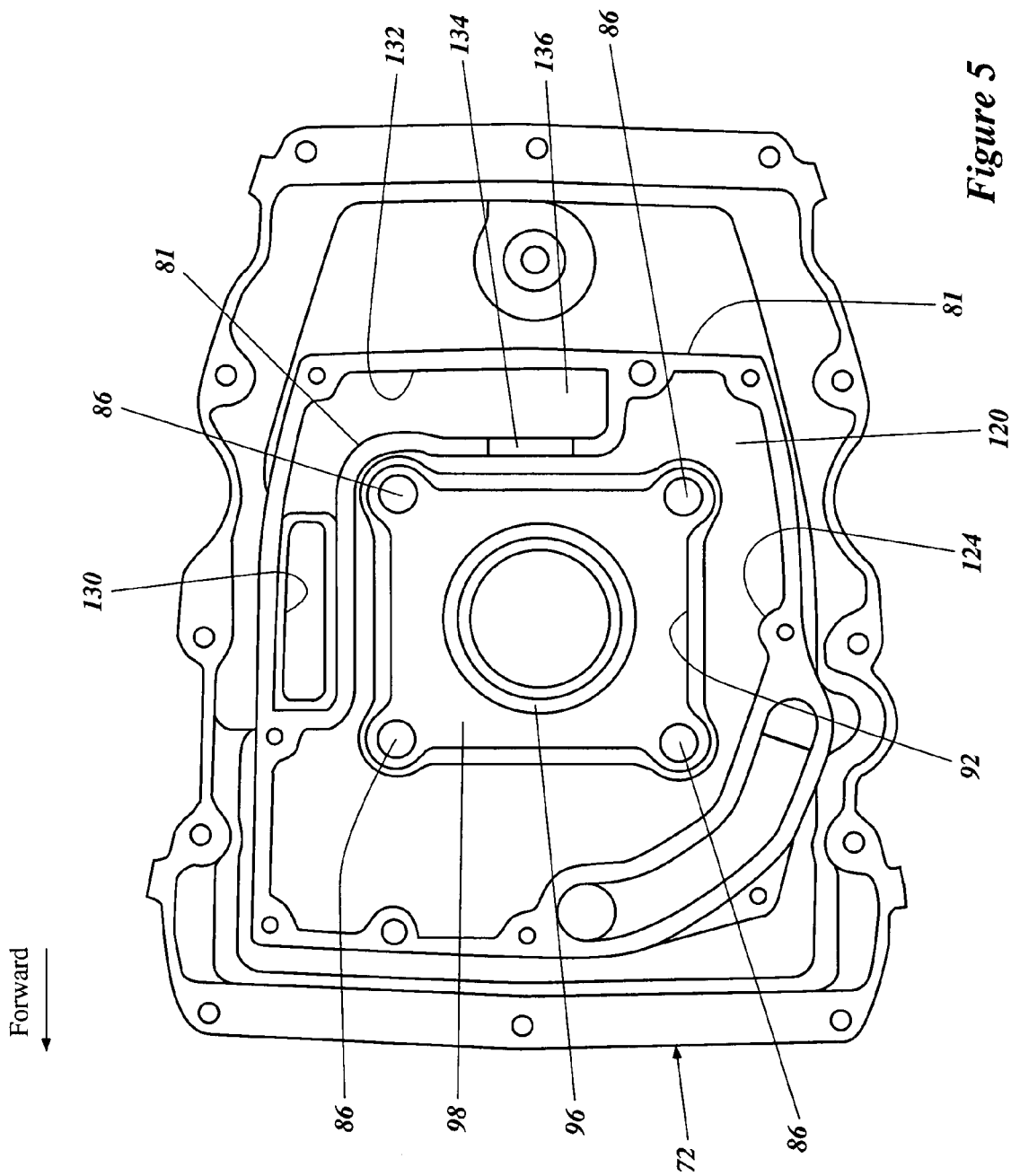
FIG. 5 illustrates a bottom view of the oil pan and the exhaust conduit.

The bottom cowling member 62 preferably has an opening through which an upper portion of an exhaust guide or engine support member 66 extends. The exhaust guide 66 is mounted on the driveshaft housing 50 and is affixed to a top end of the driveshaft housing 50 as a part of the housing unit 48. The exhaust guide member 74 preferably is made of an aluminum based alloy. The bottom cowling member 94 and the exhaust guide 66 together form a tray. The engine 54 is placed onto this tray and is affixed to the exhaust guide 66. The illustrated bottom cowling member 62 has a skirt portion extending downward to form an apron that covers a top portion of the driveshaft housing 50. Also, the exhaust guide member 66 preferably defines an exhaust passage 68 (FIG. 2, for example) through which burnt charges (e.g., exhaust gases) from the engine 54 are discharged toward internal exhaust sections of the housing unit 48.

The engine 54 in the illustrated embodiment operates on a four-cycle combustion principle. The engine 54 has a cylinder block. The presently preferred cylinder block defines four cylinder bores which extend generally horizontally and are generally vertically spaced from one another. This type of engine, however, merely exemplifies one type of engine. Engines having other numbers of cylinders, having other cylinder arrangements (V-configuration or opposing), and operating on other combustion principles (e.g., crankcase compression two-stroke or rotary) also can be employed. In addition, the engine can be formed with separate cylinder bores rather than a number of cylinder bores formed in a cylinder block. Regardless of the particular construction, the engine preferably comprises an engine body that includes at least one cylinder bore.

As used in this description, the term "horizontally" means that the subject portions, members or components extend generally in parallel to the water line where the associated watercraft is resting when the drive unit 32 is not tilted and is placed in the position shown in FIG. 1. The term "vertically" in turn means that portions, members or components extend generally normal to those that extend horizontally.

A piston preferably reciprocates within each cylinder bore. A cylinder head is affixed to one end of the cylinder block. The cylinder head, together with the associated pistons and cylinder bores, preferably define four combustion chambers. Of course, the number of combustion chambers can vary as described above. The cylinder head is covered with a cylinder head cover member.

A crankcase is coupled with the cylinder block to close the other end of the cylinder bores and, together with the cylinder block, define a crankcase chamber. A crankshaft extends generally vertically through the crankcase chamber and can be journaled for rotation about a rotational axis by several bearing blocks. Connecting rods couple the crankshaft with the respective pistons in a suitable manner so that the reciprocal movement of the pistons rotates the crankshaft.

The engine 54 preferably has an air intake system that draws the air in the cavity and delivers the air to the combustion chambers. Intake valves preferably are provided at intake ports of the respective combustion chambers to selectively allow the air to flow into the combustion chambers. An intake camshaft actuates the intake valves. The crankshaft drives the intake camshaft in a timed relationship.

The intake system preferably has throttle valves. Each throttle valve preferably is disposed within each intake passage and regulates an amount of the air or airflow to the combustion chambers. An operator of the outboard motor 30 can control the throttle valves through a remote controller or a handle bar that connected to the throttle valves. Unless the environmental circumstances change, an engine speed of the engine 54 increases generally along the increase of an amount of the air or airflow rate.

A charge former such as, for example, a fuel injection system preferably supplies fuel to the combustion chambers to make air/fuel charges in the combustion chambers. A control device such as, for example, an electronic control unit (ECU) preferably controls an amount of the fuel such that an air/fuel ratio can be kept in the optimum state. Other charge formers such as, for example, carburetors can replace the fuel injection system.

A firing device having spark plugs exposed into the combustion chambers preferably ignites the air/fuel charges in the combustion chambers also under control of the ECU. Abrupt expansion of the volume of the air/fuel charges, which burn in the combustion chambers, moves the pistons to rotate the crankshaft.

The engine 54 further has an exhaust system that routes exhaust gases in the combustion chambers to an external location of the outboard motor 30. Exhaust valves preferably are provided at exhaust ports of the respective combustion chambers to selectively allow the exhaust gases to go out from the combustion chambers or prevent the exhaust gases going out from the combustion chambers. An exhaust camshaft, which also is driven by the crankshaft, actuates the exhaust valves in the timed relationship.

In the illustrated embodiment, an exhaust manifold is defined within the cylinder block to extend generally vertically. The exhaust manifold communicates with the exhaust ports through inner exhaust passages to collect exhaust gases therefrom. The exhaust manifold also communicates with the exhaust passage 68 of the exhaust guide 66.

The majority of the exhaust gases from the exhaust passage 68 preferably are discharged to a body of water that surrounds the outboard motor 30 through the foregoing internal exhaust sections formed within the driveshaft housing 50, the lower unit 52 and the propulsion device 36. The exhaust gases at idle preferably are discharged to the atmosphere through other part of the internal exhaust sections and an idle exhaust discharge port formed at a rear portion of the driveshaft housing 50 which is always positioned out of the body of the water.

During the engine operation, heat builds in the engine body. The outboard motor 30 preferably comprises a cooling water delivery system. The illustrated outboard motor 30 employs an open-loop type water delivery system that introduces cooling water as coolant from the body of water and discharges the water that has traveled through water jackets of the engine 54 to the body of water. The water preferably is delivered to the water jackets through a water inlet formed at the lower unit 52, the lower unit 52, the driveshaft housing 50 and the exhaust guide 66. On the other hand, the water is discharged from the water jackets through the exhaust guide 66, the driveshaft housing 50, the lower unit 52 and a water outlet 70 of the lower unit 52.

The engine 54 preferably comprises a lubrication system. Although any type of lubrication systems can be applied, a closed-loop type of system is employed in the illustrated arrangement. Lubricant (e.g., oil) accumulates in an oil pan or lubricant reservoir 72. The lubricant is supplied from the oil pan 72 to circulate through engine portions that need lubrication and then returns back to the reservoir 72. At least a substantial portion of the oil pan 72 is preferably made of a plastic material, and in the illustrated embodiment, the entire oil pan 72 is made of a plastic material. The plastic oil pan is durable against salt content of seawater, acids produced from exhaust gases and water, and the like. In other words, the seawater and/or acids produced in the engine operation hardly corrode or erode the plastic oil pan 72. "Plastic," as that term is used herein, refers generally to synthetic resins and synthetic polymers, such as thermoplastics, thermosets and elastomers, including, but not limited to, materials such as silicones, epoxies, polyolefins (e.g., polyethylene and polypropylene), polyesters, polyimides, polycarbonates, polystyrenes, phenolics, polyvinyl chloride, and the like, as well as copolymers and polymer blends.

With continued reference to FIG. 1, a driveshaft is coupled with the crankshaft and extends generally vertically through the housing unit 48. The housing unit 48 journals the driveshaft for rotation and the crankshaft drives the driveshaft. The housing unit 48 also journals a propulsion shaft for rotation. The propulsion shaft extends generally horizontally through the lower unit 52. The driveshaft and the propulsion shaft are preferably oriented normal to each other (e.g., the rotation axis of the propulsion shaft is at 900 to the rotation axis of the driveshaft).

The driveshaft drives the propulsion shaft through a transmission. The propulsion shaft in turn drives the propulsion device 36. In the illustrated arrangement, the propulsion device is a propeller 76 that is affixed to an outer end of the propulsion shaft. The propeller 76 has a hub that defines at least one exhaust port that communicates with the internal exhaust sections of the housing unit 48. The exhaust gases thus can be discharged to the body of water through the port of the propeller 76. The propulsion device, however, can take the form of a dual, a counter-rotating system, a hydrodynamic jet, or any of a number of other suitable propulsion devices. Also, the exhaust gases can be discharged to the body of water through any discharge ports which are disposed on the housing unit 48 and submerged other than the exhaust port of the propulsion device 36.

A shift mechanism associated with the transmission changes positions of the transmission. The propeller 76 varies among forward, reverse and neutral modes in accordance with the positions of the transmission. In the forward mode, the propeller 76 rotates in a direction that propels the associated watercraft forwardly. In the reverse mode, the propeller 76 rotates in a reverse direction that propels the watercraft backwardly. In the neutral mode, the propeller 76 does not rotate and does not propel the watercraft either forwardly or backwardly.

With reference to FIGS. 1–5, a preferable arrangement of the oil pan 72 with the exhaust conduit 96 configured in accordance with a first embodiment of the present invention.

The illustrated oil pan 72 generally defines a doughnut shaped cavity 78 that opens upward. The cavity 78 of the oil pan 72 preferably is formed by an inner side wall 80, outer side wall 81 and a bottom wall 82. A center top of the oil pan 72 preferably has a vertically extending tubular portion 83. The center tubular portion 83 preferably has a wall that is thicker than other portions of the oil pan 72. The oil pan 72 is affixed to a bottom surface of the exhaust guide 66 at its top peripheral ends by bolts 84 and also at the center tubular portion 83 by bolts 86. The cavity 78 has a certain capacity and the lubricant oil accumulates within the cavity 78. The center tubular portion 83 has an inner surface 87 that defines an exhaust passage 88 that communicates with the exhaust passage 68 of the exhaust guide 66.

A suction pipe (not shown) preferably extends from a bottom portion of the cavity 78 generally upwardly toward the part of the lubrication system within the engine 54 through the exhaust guide 66. An oil filter preferably is attached to remove foreign substances from the lubricant oil before passing through the suction pipe. An oil pump (not shown) preferably is coupled with the driveshaft, the crankshaft or one of the camshafts to pressurize and thereby circulate the lubricant from the section pipe to the engine portions. As described above, the lubricant delivered to the engine 54 circulates within the engine body to lubricate the engine portions such as, for example, the crankshaft, the camshafts and the pistons. The cylinder block and the exhaust guide 66 define at least one lubricant return passage. The lubricant that has lubricated the engine portions falls to the bottom of the cylinder block by its own weight through the return passage. A drain port 90 is defined at a bottom portion of the oil pan 72 to drain the lubricant oil. A closure member 91 normally closes the drain port 90.

Preferably, the oil pan 72 has a surface 92 that generally defines a rectangular parallelepiped space 94 that opens downward generally below the center tubular portion 83. An exhaust conduit 96 preferably extends through the space 94. The illustrated exhaust conduit 96 is made of an aluminum based alloy. The exhaust conduit 96 preferably has a flange 98 atop thereof. The flange 98 is affixed to a bottom of the center tubular portion 83 of the oil pan 72 by the bolts 86. That is, the bolts 86 in the illustrated embodiment not only fix the oil pan 72 to the exhaust guide 66 but also fix the exhaust conduit 96 to the exhaust guide 66 through the center tubular portion 83 of the oil pan 72. The exhaust conduit 96 defines an exhaust passage 100 that communicates with the exhaust passage 88 of the center tubular portion 83. The exhaust gases from the exhaust guide 66 thus descend through the exhaust passages 88, 100 to the exhaust conduit 96.

In the illustrated embodiment, the exhaust guide 66 also defines a water discharge passage 102 through which the water that has traveled through the water jackets in the engine 54 descends. The center tubular portion 83 of the oil pan 72 also defines a water discharge passage 104 that communicates with the discharge passage 102. The water discharge passage 104 preferably is formed generally wholly around the exhaust passage 88. The flange 98 of the exhaust conduit 96 further defines a water discharge path 106 that communicates with the water discharge passage 104. The water discharge path 106 also is formed generally wholly around the exhaust passage 100. The water from the engine 54 thus flows down to the space 94 through the water discharge passages 102, 104 and the water discharge path 106. The water can descend further along an outer surface of the exhaust conduit 96.

A muffler 110 preferably is disposed below the exhaust conduit 96. The muffler 110 defines an exhaust expansion chamber that communicates with the exhaust passage 100 of the exhaust conduit 96 such that the exhaust gases expand at least once before discharged to the body of water.

In the illustrated embodiment, the muffler 110 is mounted onto the bottom of the oil pan 72 together with a partition or pool forming member 112 by bolts 114. The muffler 110 and the partition 112 in the illustrated embodiment are made of metal such as, for example, an aluminum based alloy. A bottom portion of the exhaust conduit 96 extends into the expansion chamber through an opening of the partition 112. Because the water descends along the outer surface of the exhaust conduit 96, a seal 116 is interposed between a top surface of the partition 112 and a small flange 118 formed around the bottom portion of the exhaust conduit 96 to prevent the water from entering the exhaust expansion chamber.

Preferably, a top surface of the partition 112 is slightly spaced apart from a bottom surface 120 of the oil pan 72 such that a bottom space 122 is defined to communicate with the space 94. The bolts 114 preferably are affixed to the most peripheral edges 124 of the oil pan 72 to have a maximum area of the outer bottom surface 120 of the oil pan 72 face the bottom space 122. The peripheral edges 124 contiguously embank the bottom space 120.

The oil pan 72 in the illustrated embodiment further defines a vertical water gallery 130 (FIG. 4) on the port side by bifurcating the outer side wall 81. The doubled outer side wall 81 also defines a generally L-shaped horizontal water gallery 132 that communicates with the vertical water gallery 130. The horizontal water gallery 132 also is connected to the space 94 through a drain port 134 that is located right behind the exhaust conduit 96. The horizontal and vertical water galleries 130, 132 together form a further water discharge passage 136. The vertical water gallery 130 opens upward generally on the same level with the top surface of the flange 98 of the exhaust conduit 96 to form a spillway 140.

As thus constructed, the water descending along the outer surface of the exhaust conduit 96 accumulates within the spaces 94, 122 and further fills the horizontal and vertical galleries 132, 130. The spaces 94, 122 thus together define a water pool 142. The height of the spillway 140 regulates the water level of the water pool 142. The water spilling from the vertical water gallery 130 descends along the outer side wall 128 that forms the spillway 140 and goes out to the body of water through the water outlet 70.

The water in the water pool 142 is always replaced by the water from the engine 54. The water in the water pool 142 thus can effectively cool the exhaust conduit 96 that was heated by the exhaust gases coming from the engine 54 and also can isolate the oil pan 72 from the exhaust conduit 96. In one alternative, fresh water that has not traveled through the water jackets of the engine 54 can be supplied to the water pool 142 instead of the water that has heated by the engine 54.

The center tubular portion 83 of the oil pan 72 in this embodiment is exposed to the exhaust gases because the center tubular portion 83 itself defines the exhaust passage 88. Occasionally, flames from the combustion chambers of the engine 54 can reach the exhaust passage 88. The heat of the exhaust gases or the flames can melt a surface of the center tubular portion 83 or deform the tubular portion 83.

A protective member 146 thus is provided in this embodiment to protect the center tubular portion 83 from the heat or the flames. The protective member 146 preferably is made of a piece of sheet metal and thus is generally shaped flat. More preferably, the sheet metal used in this embodiment is stainless steel. Of course, other metal materials such as, for example, iron, aluminum, titanium and any alloys of these metals can be used. The protective member 146 can be produced by, for example, a press cutting process from sheet metal. The protective member 146 is interposed between the bottom surface of the exhaust guide 66 and the top surface of the center tubular portion 83. Preferably, the tubular portion 83 has a recess 148, which generally has the same size as the protective member 146, on its top surface. The illustrated protective member 146 fits in the recess 148. The protective member 146 preferably is affixed to the exhaust guide 66 by the bolts 86 together with the tubular portion 83 and the exhaust conduit 96.

In one variation, the recess 148 can be formed on the bottom of the exhaust guide 66 rather than on the center tubular portion 83 of the oil pan 72.

The protective member 146 has an orifice 150 that preferably has an inner diameter smaller than the inner diameter of the exhaust passage 68 and also smaller than the inner diameter of the exhaust passage 88. The illustrated orifice 150 is formed straightly and parallel to a center axis that extends through the exhaust passages 68, 88, 100. The orifice 150 can be punched off simultaneously in the press cutting process of the metal sheet. Because of the orifice 150, the protective member 146 can centralize the exhaust gases and the flames and further can keep them apart from the inner surface of the center tubular position 83. In other words, the protective member 146 directs the exhaust gases and the flames toward a center axis of the exhaust passage 88. As a result, the center tubular portion 83 is not directly exposed to the exhaust gases and the flames. The surface of the center tubular portion 83 thus is effectively protected from the heat of the exhaust gases and the flames.

The inner diameter of the orifice 150 can vary to more effectively protect the center tubular portion 83. The most suitable diameter can be determined, for example, after one or more experiments or tests. The orifice 150 can taper downwardly to effectively direct the flames toward the center axis.

Additionally, the protective member 146 has an aperture 152 through which the water discharge passage 104 communicates with the water discharge passage 102. The aperture 152 also can be punched off simultaneously in the press cutting process of the metal sheet. The water from the engine 54 thus can move to the space 94 without obstruction by the protective member 146.

The oil pan 72 in this embodiment can have a sufficient capacity for the lubricant oil because the center tubular portion 83 directly exposes the exhaust gases and the flames without any isolation space and also because the center tubular portion 83 can be as thin as possible. These are because the protective member 146 centralizes the exhaust gases and the flames.

The illustrated protective member 146 that is made of metal sheet is beneficial because the protective member 146 can be easily produced by only cutting a large sized metal sheet. Thus, production cost of the protective members 146 can be small.

Because the protective member 146 and the center tubular portion 83 in the illustrated embodiment are cooled by the water that flows the respective water discharge passages 152, 104, both the protective member 146 and the center tubular portion 83 cannot be excessively heated.

In addition, the water pool 142 can not only isolate the oil pan 72 from the exhaust conduit 96 but also cool the lubricant oil accumulated within the oil pan 72.

Figure 7:
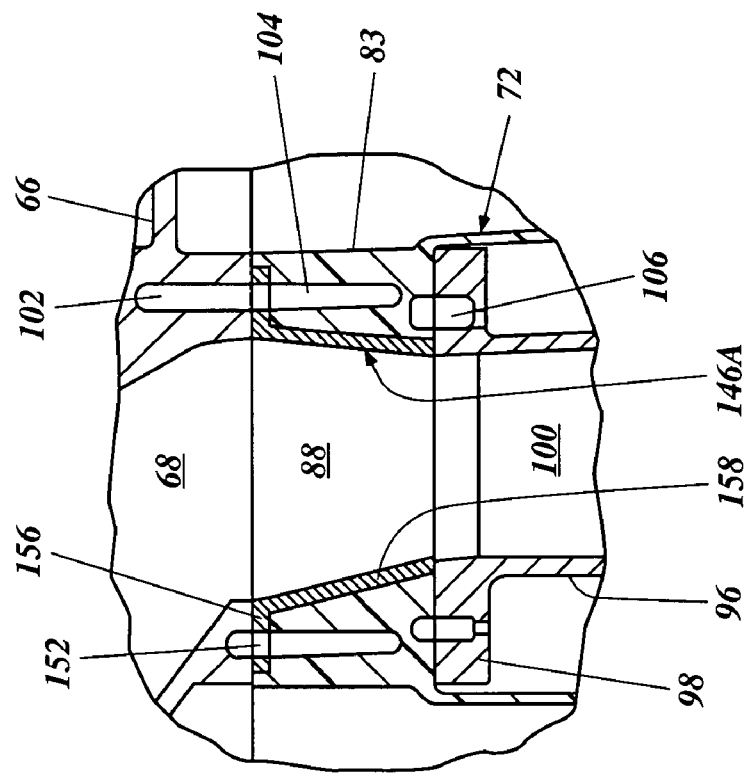
FIG. 7 partially illustrates a front cross-sectional view of the housing unit showing the modified protective member of FIG. 6.
Figure 6:
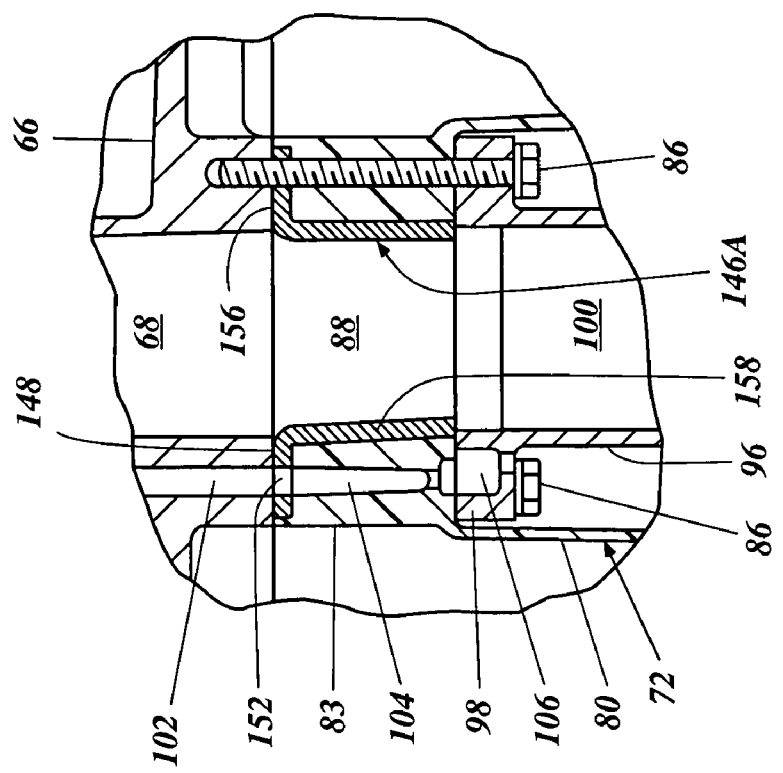
FIG. 6 partially illustrates a side cross-sectional view of the housing unit showing another protective member modified in accordance with a second embodiment of the present invention.

With reference to FIGS. 6 and 7, a modified protective member 146A is employed in a second embodiment. The members, components and passages that have been already described in the former embodiment are assigned with the same reference numerals and therefore will not be repeatedly described. The following other embodiments also are described in the same manner.

The protective member 146A in this embodiment preferably has a fixed portion 156 and a cover portion 158. The fixed portion 156 is interposed between the bottom surface of the exhaust guide 66 and the top surface of the center tubular portion 83 of the oil pan 72. The fixed portion 156 is affixed to the exhaust guide 66 by the bolts 86 together with the center tubular portion 83 and the exhaust conduit 96. The cover portion 158 extends downward from the fixed portion 156 and abuts on the inner surface of the center tubular portion 83 to completely cover the tubular portion 83.

The modified protective member 146A preferably is made of a piece of sheet metal, more preferably, a piece of stainless steel sheet. The protective member 146A can be produced by, for example, the press cutting process and a drawing process.

Because the protective member 146A in this embodiment completely covers the center tubular member 83, the inner surface of the tubular member 83 is not exposed to the exhaust gases and the flames. The modified protective member 146A thus can protect the center tubular portion 83 more than the protective member 146 in the first embodiment.

Figure 9:
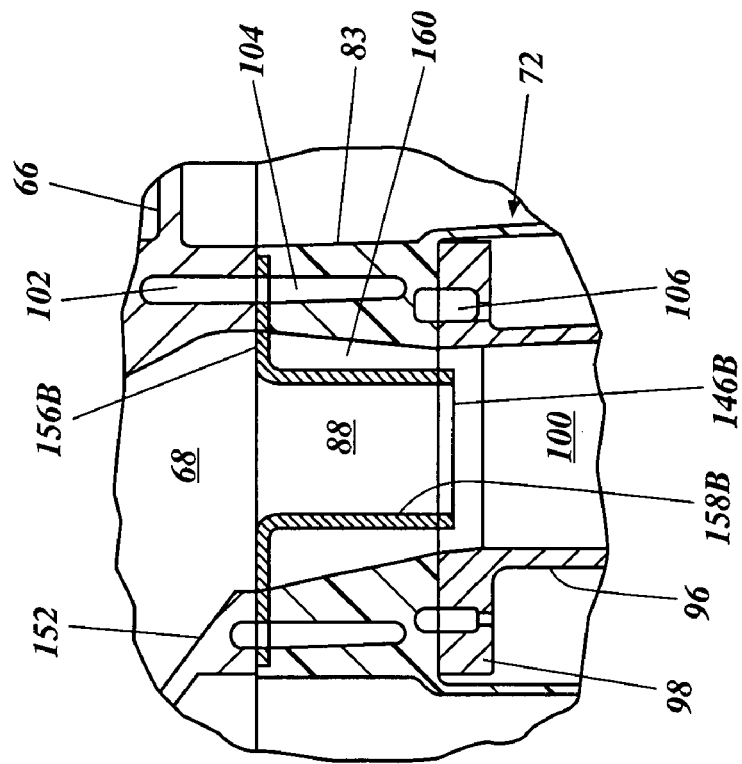
FIG. 9 partially illustrates a front cross-sectional view of the housing unit showing the further modified protective member of FIG. 9.
Figure 8:
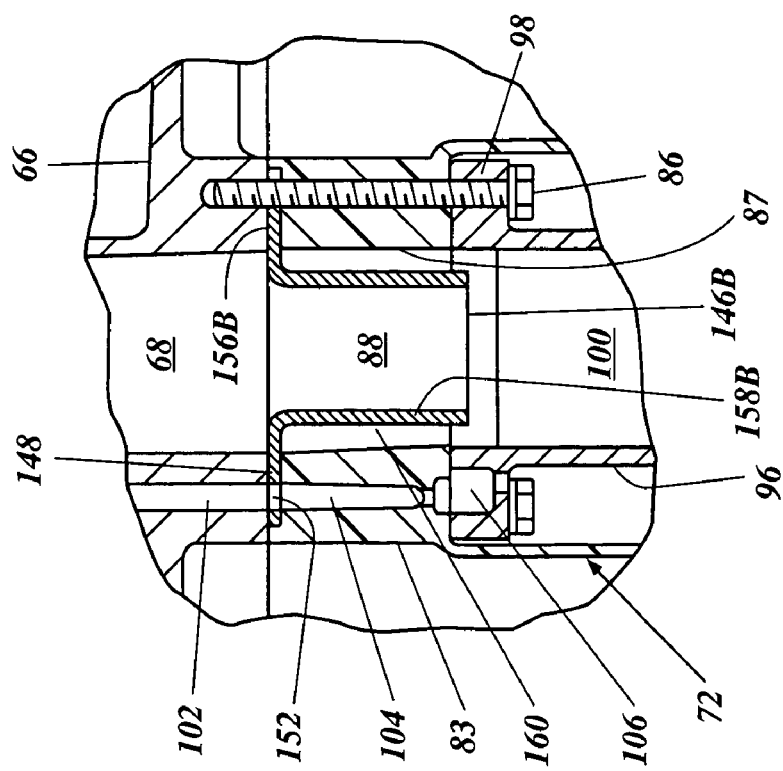
FIG. 8 partially illustrates a side cross-sectional view of the housing unit showing a further protective member modified in accordance with a third embodiment of the present invention.

With reference to FIGS. 8 and 9, a further modified protective member 146B is employed in a third embodiment.

The protective member 146B in this embodiment also is made of a piece of sheet metal, preferably, a piece of stainless steel sheet. The protective member 146B has a fixed portion 156B and a cover portion 158B. The cover portion 158B is cylindrically shaped and has an inner diameter that is smaller than the inner diameter of the tubular portion 83. Accordingly, the protective member 146B does not abut on the tubular portion 83. Rather, the cover portion 158B of the protective member 146B is spaced apart from the surface of the tubular portion 83 to create a space therebetween. The cover portion 158B preferably is longer than the center tubular portion 83 such that a bottom end of the cover portion 58B extends lower than the bottom end of the tubular portion 83.

The protective member 146B in this embodiment can separate the exhaust gases and the flames from the center tubular portion 83. In addition, because of the space 160 created between the tubular portion 83 of the oil pan 72 and the cover portion 158B of the protective member 146B, the heat of the exhaust gases cannot directly transfer to the tubular member 83. Thus, the modified protective member 146B can further protect the center tubular portion 83.

Figure 10:
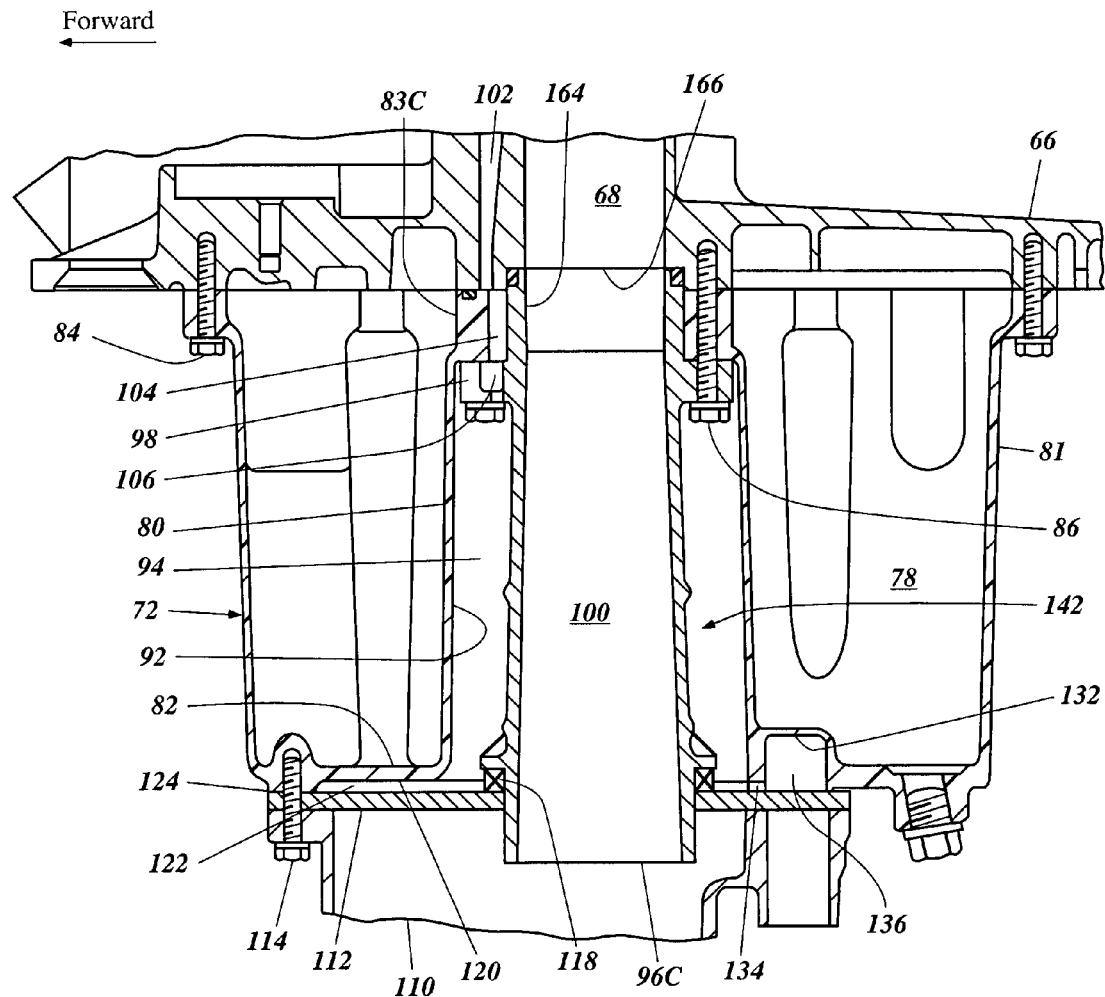
FIG. 10 partially illustrates a side cross-sectional view of the housing unit showing another exhaust conduit and also another oil pan modified in accordance with a fourth embodiment of the present invention.
Figure 11:
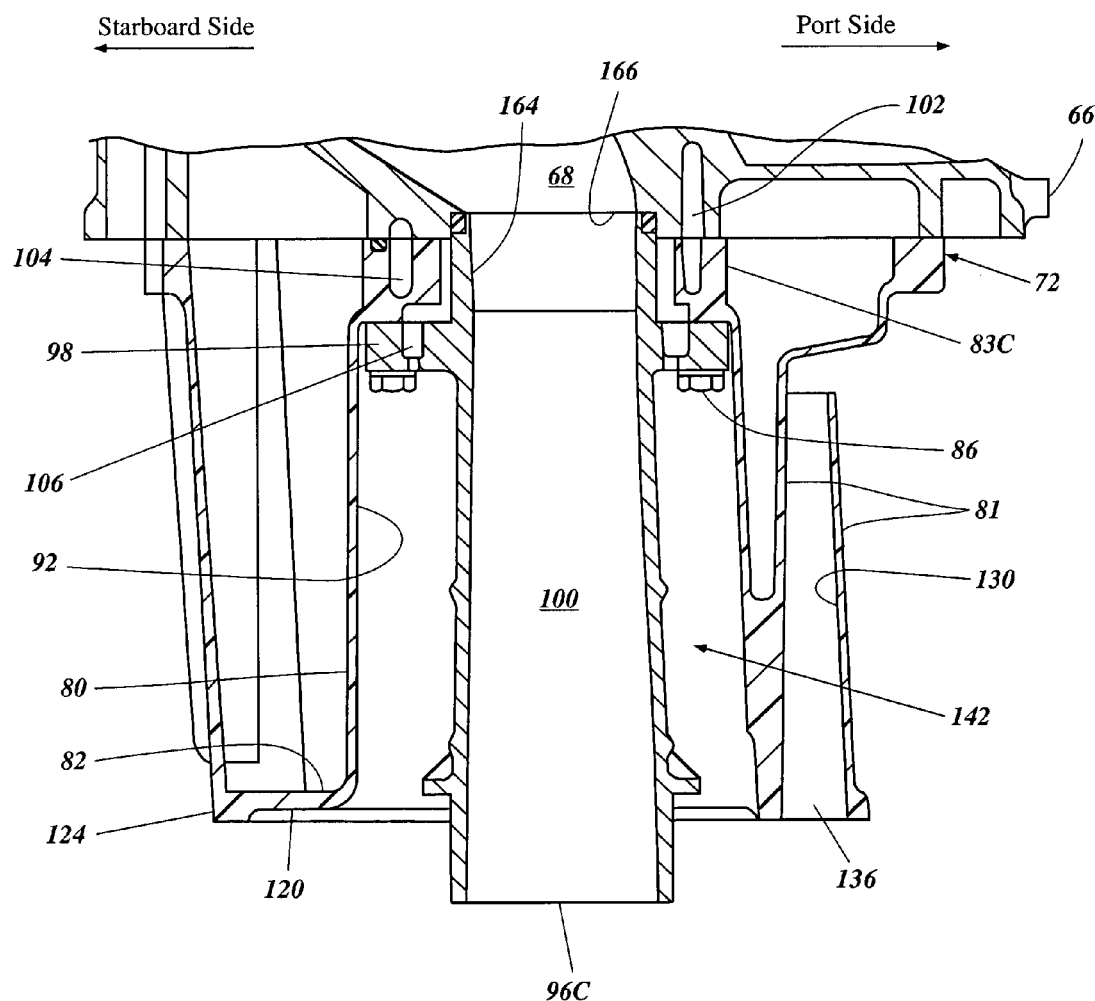
FIG. 11 partially illustrates a front cross-sectional view of the housing unit showing the modified exhaust conduit and oil pan of FIG. 10.

With reference to FIGS. 10 and 11, a modified exhaust conduit 96C and a modified center tubular portion 83C both configured in accordance with a fourth embodiment of the present invention is described below.

A center tubular portion 83C of the oil pan 72 in this embodiment is formed shorter than those in the foregoing embodiments. On the other hand, an exhaust conduit 96C is longer than those in the foregoing embodiments and extends to the bottom end of the exhaust guide 66 through the shortened tubular portion 83C. That is, a top portion 164 of the exhaust conduit 96C is directly coupled with the exhaust guide 66 without interposing the center tubular portion 83C therebetween. Preferably, a recess 166 is formed on the bottom surface of the exhaust guide 66 and a top end of the exhaust conduit 96C is fitted into the recess 166. In other words, the top end of the illustrated exhaust conduit 96C is closer to the engine 54 than the tubular portion 83C that extends adjacent to the top end of the exhaust conduit 96C.

The exhaust conduit 96C thus extends over the oil pan 72 such that the oil pan 72 does not expose to the exhaust gases or the flames. Particularly, the top portion 164 of the exhaust conduit 96C can effectively protect the center tubular portion 83C from the heat of the exhaust gases or the flames instead of the protective members 146, 146A, 146B in the foregoing embodiments. In one variation, the top end of the exhaust conduit 96C can be on the same level as the top end of the center tubular portion 83C and this alternative construction can sufficiently protect the tubular portion 83C also.

Because the center tubular portion 83C is shortened, the space 94 can be larger than those in the foregoing embodiments. Thus, the water pool 142 in this embodiment can cool the lubricant oil in the oil pan 72 more than the water pools 142 in the foregoing embodiments.

Figure 12:
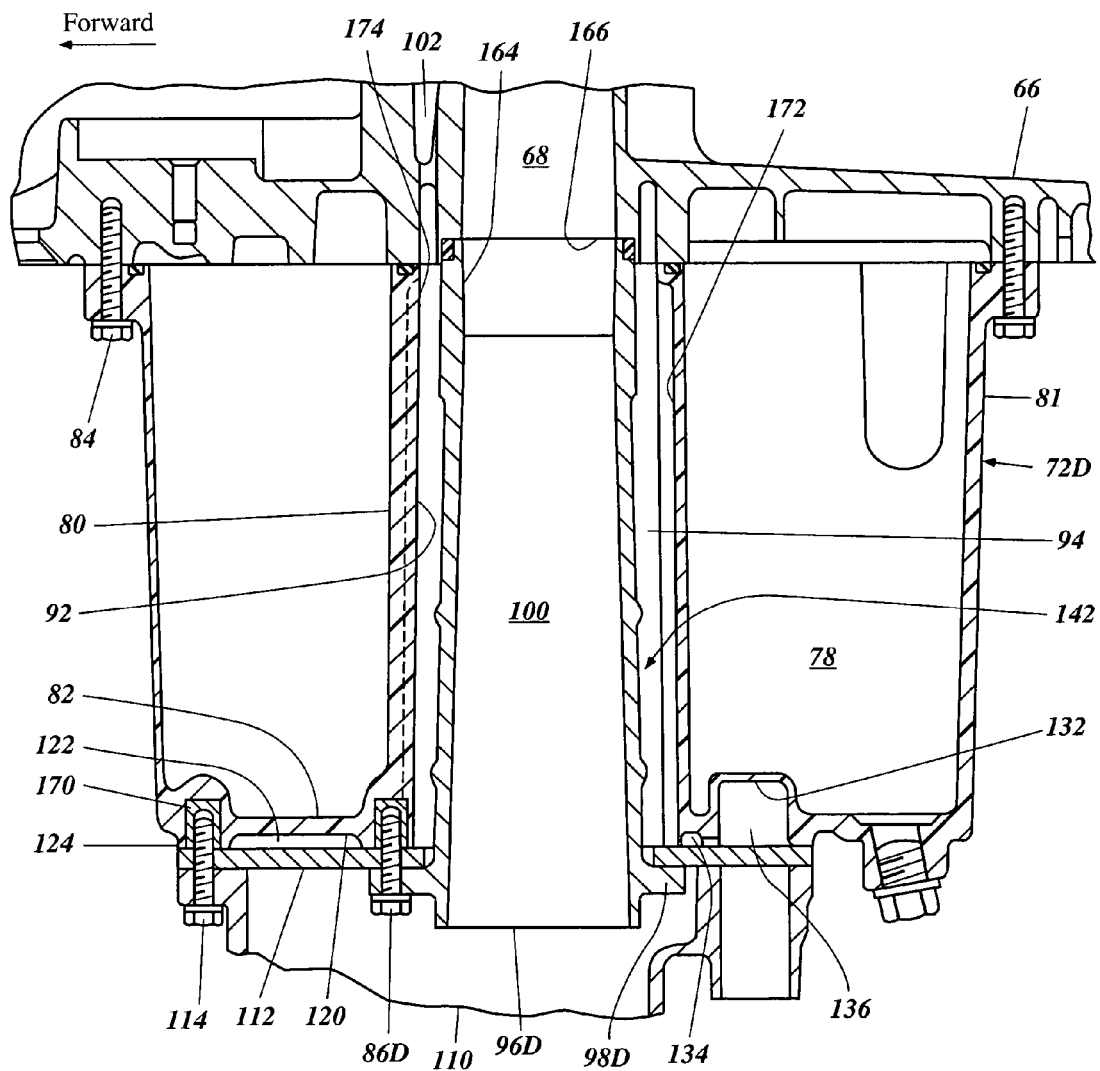
FIG. 12 partially illustrates a side cross-sectional view of the housing unit showing a further exhaust conduit and also a further oil pan modified in accordance with a fifth embodiment of the present invention.

With reference to FIG. 12, a further modified exhaust conduit 96D and a modified oil pan 72D both configured in accordance with a fifth embodiment of the present invention is described below.

The oil pan 72D in this embodiment has no center tubular portion. The space 94 thus is formed fully between the bottom end of the exhaust guide 66 and the top surface of the partition 112.

The exhaust conduit 96D has almost the same configuration and length as the exhaust conduit 96C and its top end is fitted into the recess 166 of the exhaust guide 66. The exhaust conduit 96D, however, does not have the flange 98, but rather has a flange 98D that extends at an elevation lower than the bottom surface of the partition 112. The flange 98D is affixed to the bottom of the oil pan 72D by bolts 86D together with the partition 112. The space 122 under the bottom surface 120 of the oil pan 72D still communicates with the space 94 to form the water pool 142 because portions of the oil pan 72D where the bolts 86D are affixed are not contiguously formed. Additionally, nuts 170 made of a metal material preferably are inserted into the bottom peripheral portions of the oil pan 72D to receive the bolts 84D and the bolts 114.

The surface 92 of the oil pan 72D extends closer to the outer surface of the exhaust conduit 96D than those of the foregoing embodiments because the center tubular portion is not provided and the flange 98D is affixed to the partition 112 and the water pool 94 still effectively isolates the oil pan 72D from the exhaust conduit 96D. The surface 92 preferably has a wave form. More specifically, the surface 92 has a plurality of vertical recesses 172 and a plurality of vertical ridges 174 both alternately and continuously repeat on the surface 92. Thus, the areas, the surface 92 is larger than a plain surface. In one variation, the recesses and the ridges can extend horizontally. Also, in another variation, the recesses and the ridges can appear at random on the surface 92.

Because the surface 92 extends closer to the outer surface of the exhaust conduit 96D, the doughnut shape cavity 78 in this embodiment has a larger capacity even though the oil pan 72D is made of plastic.

Figure 13:
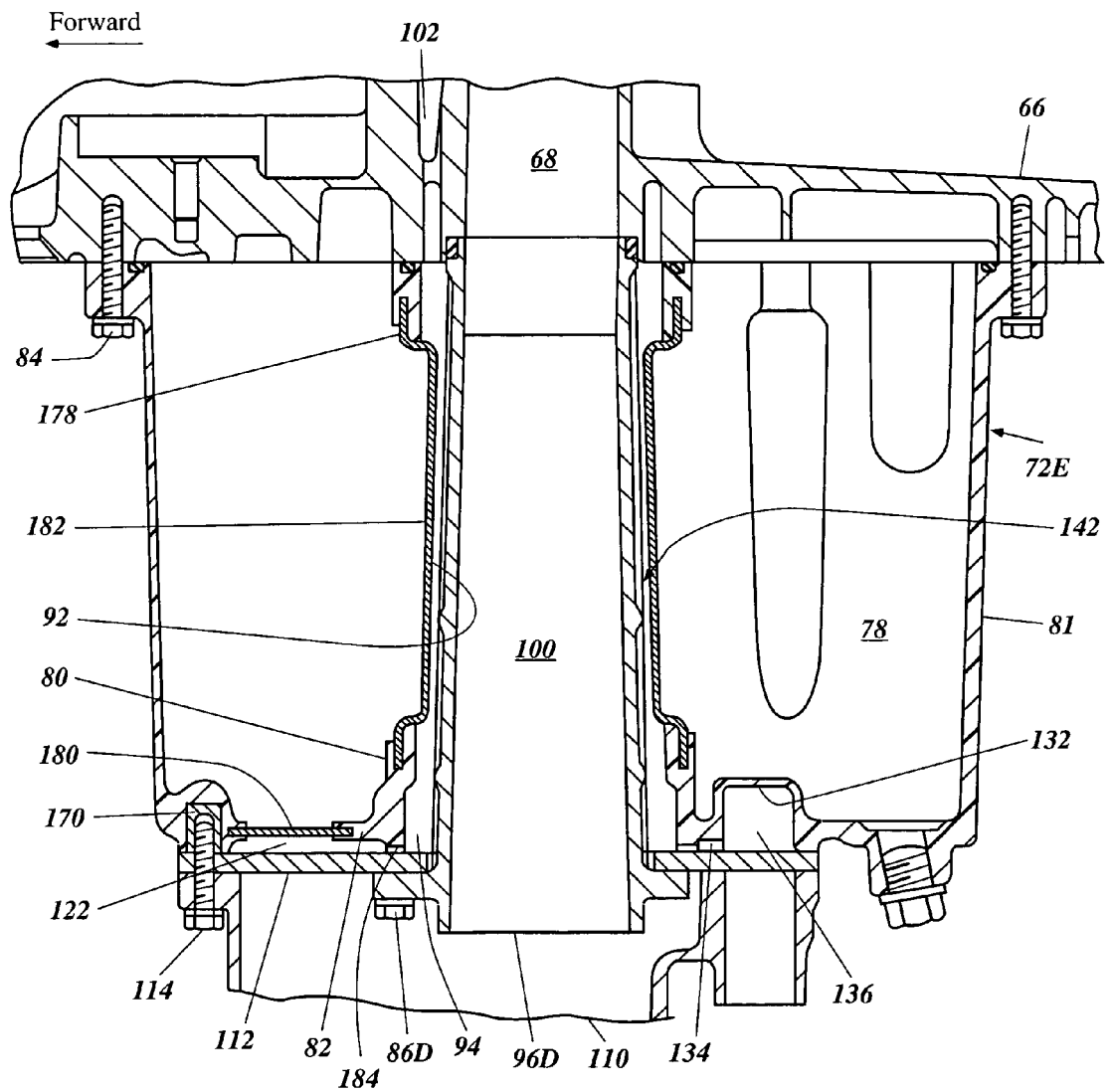
FIG. 13 partially illustrates a side cross-sectional view of the housing unit showing a combination of the exhaust conduit of FIG. 12 and also an oil pan further modified in accordance with a sixth embodiment of the present invention.

With reference to FIG. 13, a combination of a further modified oil pan 72E with the foregoing exhaust conduit 96D configured in accordance with a sixth embodiment of the present invention is described below.

A part of the oil pan 72E in this embodiment incorporates a side wall member 178 and a bottom wall member 180 both of which are made of a sheet metal such as, for example, stainless steel. Other metal materials such as, for example, iron, aluminum, titanium and any alloys of these metals can be used. More specifically, in the illustrated embodiment, the inner side wall 80 that has the surface 92 facing the outer surface of the exhaust conduit 96D has the side wall member 178 as a part thereof. The side wall member 178 preferably has an extended portion 182 that extends toward the exhaust conduit 96D. In addition, the illustrated bottom wall 82 has the bottom wall member 180. Preferably, the side wall member 178 and the bottom wall member 180 are previously inserted into a plastic material of the oil pan 72E that has not hardened. Then, the side and bottom wall members 178, 180 are fixed to their own predetermined positions when the plastic material hardens.

Additionally, a water path 184 connects the spaces 94, 122 with each other. The water path 184 is formed on a whole bottom end of the inner side wall 80 except for portions where the bolts 86D are fixed. Although not shown, the oil pan 72D of FIG. 12 has a similar water path to connect the spaces 94, 122 to each other.

Because the wall members 178, 180 made of metal have a heat transfer rate higher than that of a plastic material, the lubricant oil in the oil pan 72E can be effectively transferred to the water in the water pool 142 and can be cooled faster. In addition, the extended portion 182 of the side wall member 178 can contribute to increasing the capacity of the doughnut shaped cavity 78. The oil pan 72E thus can contain a sufficient volume of the lubricant oil.

Although this invention has been disclosed in the context of certain preferred embodiments, it will be understood by those skilled in the art that the present invention extends beyond the specifically disclosed embodiments to other alternative embodiments and variations and/or uses of the invention and obvious modifications and equivalents thereof. It is also contemplated that various combinations or sub-combinations of the specific features and aspects of the embodiments may be made and still fall within the scope of the invention. It should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising an internal combustion engine, an exhaust conduit disposed below the engine, the exhaust conduit forming a first exhaust passage to discharge exhaust gases from the engine, a lubricant pan disposed below the engine for containing a reservoir of lubricant for the engine, at least a portion of the lubricant pan extending about at least a portion of the exhaust conduit and at least a substantial portion of the lubricant pan being comprised of a plastic material, and defining at least a second portion of the exhaust passage and a protection member providing thermal protection to protect the lubricant pan from flames that descend from the engine toward the exhaust conduit and the heat of the exhaust gases, wherein the protection member is exposed to the exhaust gases, the exhaust gases reaching the first exhaust passage through an orifice in the protection member, an inner diameter of the orifice being smaller than an inner diameter of the first exhaust passage.

2. The outboard motor as set forth in claim 1, the second exhaust passage communicates with the first exhaust passage such that at least a substantial portion of the exhaust gases from the engine reach the first exhaust passage through the second exhaust passage.

3. The outboard motor as set forth in claim 2 additionally comprising an exhaust guide member that forms a third exhaust passage communicating with the second exhaust passage, the third exhaust passage guides the exhaust gases from the engine to the second exhaust passage, and the protective member is interposed between the exhaust guide member and the lubricant pan.

4. The outboard motor as set forth in claim 2, wherein an inner diameter of the orifice is smaller than an inner diameter of the second exhaust passage.

5. The outboard motor as set forth in claim 2, wherein the protective member has a generally flat shape.

6. The outboard motor as set forth in claim 2, wherein the protective member is a metal plate.

7. The outboard motor as set forth in claim 1, wherein a top end of the exhaust conduit is at least on the same level as a top end of a portion of the lubricant pan that extends adjacent to the top end of the exhaust conduit.

8. The outboard motor as set forth in claim 7, wherein the top end of the exhaust conduit is closer to the engine than the top end of the portion of the lubricant pan.

9. The outboard motor as set forth in claim 7, wherein a bottom end of the exhaust conduit is positioned farther from the engine than a bottom portion of the lubricant pan that lies next to the exhaust conduit.

10. An outboard motor comprising an internal combustion engine, an exhaust conduit disposed below the engine, the exhaust conduit forming a first exhaust passage to discharge exhaust gases from the engine, a lubricant pan disposed below the engine for containing a reservoir of lubricant for the engine, at least a portion of the lubricant pan extending about at least a portion of the exhaust conduit and at least a substantial portion of the lubricant pan being comprised of a plastic material, and a protection member configured to protect the lubricant pan from flames that descend from the engine, toward the exhaust conduit and the heat of the exhaust gases, a portion of the lubricant pan forms a second exhaust passage communicating with the first exhaust passage, the exhaust gases from the engine reaching the first exhaust passage through the second exhaust passage, the protection member includes an orifice through which the exhaust gases pass, the protective member is disposed generally atop of the portion of the lubricant pan and shaped to deflect the exhaust gases toward a center axis of the second exhaust passage.

11. The outboard motor as set forth in claim 10, wherein an inner diameter of the orifice is smaller than an inner diameter of the second exhaust passage.

12. The outboard motor as set forth in claim 11 additionally comprising an exhaust guide member that forms a third exhaust passage communicating with the second exhaust passage, the third exhaust passage guides the exhaust gases from the engine to the second exhaust passage, and the protective member is interposed between the exhaust guide member and the lubricant pan.

13. The outboard motor as set forth in claim 12, wherein the inner diameter of the orifice is smaller than an inner diameter of the third exhaust passage.

14. An outboard motor comprising an internal combustion engine, an exhaust conduit disposed below the engine, the exhaust conduit forming a first exhaust passage to discharge exhaust gases from the engine, a plastic lubricant pan disposed below the engine, at least part of the lubricant pan surrounding the exhaust conduit, a portion of the lubricant pan forming a second exhaust passage that communicates with the first exhaust passage such that the exhaust gases from the engine reach the first exhaust passage through the second exhaust passage, and a protective member exposed to the exhaust gases and disposed generally at the second exhaust passage, the protective member having an orifice through which the exhaust gases pass, the protective member shaped for deflecting exhaust gases or flames from the engine generally away from the inner surface of the second exhaust passage toward a center axis of the second exhaust passage.

15. The outboard motor as set forth in claim 14, wherein an inner diameter of the protective member is smaller than an inner diameter of the second exhaust passage.

16. The outboard motor as set forth in claim 14, wherein the protective member is shaped generally flat.

17. The outboard motor as set forth in claim 14, wherein the protective member has a cover portion that at least partially covers a surface of the portion of the lubricant pan that defines the second exhaust passage.

18. The outboard motor as set forth in claim 17, wherein the cover portion is spaced apart from the surface.

19. An outboard motor comprising an internal combustion engine, an exhaust conduit disposed below the engine, the exhaust conduit forming at least a first portion of an exhaust passage that extends along a center axis to discharge exhaust gases from the engine, a lubricant pan disposed below the engine and surrounding the center axis of the exhaust passage, at least a substantial portion of the lubricant pan being comprised of a plastic material, and protection means exposed to the exhaust gases and shaped for deflecting exhaust gases and flames from the engine generally toward the center axis of the exhaust passage and away from a portion of the lubricant pan that defines at least a second portion of the exhaust passage, wherein the exhaust gases reach the first portion through an orifice in the protection means.

20. An outboard motor comprising an internal combustion engine, an exhaust passage extending below the engine and sized to accommodate exhaust gases from the engine operating at high engine speeds, the exhaust passage formed by an exhaust conduit disposed below the engine and a protective member, a lubricant pan disposed below the engine for containing a reservoir of lubricant for the engine, at least a portion of the lubricant pan defining at least a portion of the exhaust conduit and at least a substantial portion of the lubricant pan being comprised of plastic, and the protective member being exposed to the exhaust gases and shaped for deflecting flames that descend from the engine toward a center axis of the exhaust conduit so as to provide a thermal barrier for at least a portion of the lubricant pan.

21. The outboard motor of claim 20, wherein a substantial portion of the exhaust gases from the engine flow through the protective member when the engine operates at engine speeds above idle.

* * * * *

UNITED STATES PATENT AND TRADEMARK OFFICE
CERTIFICATE OF CORRECTION

PATENT NO. : 7,223,139 B2
APPLICATION NO. : 10/818875
DATED : May 29, 2007
INVENTOR(S) : Sumigawa et al.

It is certified that error appears in the above-identified patent and that said Letters Patent is hereby corrected as shown below:

On the Title Page, Item (56) (U.S. Patent Documents), line 8, after "10/2003" please delete "Isozaki et al." and insert -- Shibata et al. --, therefor.

On Drawing Sheet 3 of 11 (Figure 3), right of pointer 120 and left of pointer 118, after "120" please insert -- 116, and corresponding pointer --, therefor.

On Drawing Sheet 8 of 11 (Figure 10), right of pointer 120 and left of pointer 118, after "120" please insert -- 116, and corresponding pointer --, therefor.

At column 1, line 39, please delete "location ." and insert -- location. --, therefor.

At column 2, line 30, after "gases" please insert -- . --, therefor.

At column 3, lines 44-45, please delete "invention;" and insert -- invention. --, therefor.

At column 6, line 66, please delete "900" and insert -- 90° --, therefor.

At column 10, line 50, please delete "metal,.more" and insert -- metal, more --, therefor.

At column 12, line 18, please delete "areas," and insert -- area of --, therefor.

At column 13, line 22, in Claim 1, after "passage" please insert -- , --, therefor.

At column 13, line 23, in Claim 1, after "protection to" please delete "protect", therefor.

UNITED STATES PATENT AND TRADEMARK OFFICE
CERTIFICATE OF CORRECTION

PATENT NO. : 7,223,139 B2
APPLICATION NO. : 10/818875
DATED : May 29, 2007
INVENTOR(S) : Sumigawa et al.

It is certified that error appears in the above-identified patent and that said Letters Patent is hereby corrected as shown below:

At column 13, line 30, in Claim 2, after "claim 1," please insert -- wherein --, therefor.

At column 14, line 3, in Claim 10, after "engine" please delete ",", therefor.

At column 14, line 41, in Claim 14, after "away from" please delete "the" and insert -- an -- in place thereof, therefor.

Signed and Sealed this

Fourteenth Day of October, 2008

JON W. DUDAS
*Director of the United States Patent and Trademark Office*